United States Patent
Nelson et al.

(10) Patent No.: US 7,657,763 B2
(45) Date of Patent: Feb. 2, 2010

(54) SYSTEMS AND METHODS FOR SELECTIVELY CONTROLLING ELECTRICAL OUTLETS USING POWER PROFILING

(75) Inventors: Mark E. Nelson, Lindon, UT (US); W. Bryant Eastham, Draper, UT (US); James L. Simister, Pleasant Grove, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 441 days.

(21) Appl. No.: 11/321,705

(22) Filed: Dec. 29, 2005

(65) Prior Publication Data

US 2007/0155349 A1 Jul. 5, 2007

(51) Int. Cl.
*G06F 1/26* (2006.01)
(52) U.S. Cl. .................................. 713/300; 323/234
(58) Field of Classification Search .............. 713/300; 323/234

See application file for complete search history.

(56) References Cited

U.S. PATENT DOCUMENTS

| | | | |
|---|---|---|---|
| 5,936,817 A | * | 8/1999 | Matsko et al. ............... 361/72 |
| 6,667,600 B2 | | 12/2003 | Fogleman |
| 6,759,763 B2 | * | 7/2004 | Barton ......................... 307/39 |
| 6,760,566 B1 | * | 7/2004 | Wright et al. .............. 455/13.4 |
| 6,990,394 B2 | * | 1/2006 | Pasternak ................... 700/295 |
| 7,041,899 B2 | | 5/2006 | Stekelenburg |
| 2005/0043860 A1 | | 2/2005 | Petite |
| 2005/0184856 A1 | | 8/2005 | Pourchot |
| 2006/0250277 A1 | * | 11/2006 | Colak ....................... 340/932.2 |

FOREIGN PATENT DOCUMENTS

| EP | 0833425 | 4/1998 |
|---|---|---|
| GB | 2288291 | 10/1995 |

* cited by examiner

*Primary Examiner*—Thuan N Du
(74) *Attorney, Agent, or Firm*—Austin Rapp & Hardman

(57) ABSTRACT

A system for selectively controlling electrical outlets using power profiling is disclosed. There is a plurality of electrical outlets that each comprises a power socket capable of receiving a plug, an outlet identification and a switch that when in a first position no power is available at the power socket, and when the switch is in a second position power is available at the power socket. A controller is in electronic communication with the plurality of electrical outlets. The controller includes a processor and memory in electronic communication with the processor. The controller also includes power profiles and operates to receive data from an electrical outlet of the plurality of electrical outlets. A device or class of device is identified based on the received data. A power profile is identified based on the received data. Action is taken based on the power profile.

22 Claims, 12 Drawing Sheets

SYSTEMS AND METHODS FOR SELECTIVELY CONTROLLING ELECTRICAL OUTLETS USING POWER PROFILING

TECHNICAL FIELD

The present invention relates generally to electrical technology. More specifically, the present invention relates to improved systems and methods for selectively controlling electrical outlets using power profiling.

BACKGROUND

Most homes include at least one electrical outlet that provides the electricity necessary to operate household appliances, television sets, computers, etc. The standard electrical outlet in the United States includes two vertical slots and a round hole centered below these two slots. The left vertical slot is the "neutral" slot and is slightly larger than the right vertical slot which is the "hot" slot. The hole below the two slots is designated as "ground."

Each of these electrical outlets is connected to the home's circuit breaker by a wire. The circuit breaker is a safety feature that cuts off the power supply to the electrical outlet when the current flow rises above a certain threshold. For example, if a wire is placed in the hot slot and the neutral slot, there would be a tremendous amount of current flowing through the wire. The circuit breaker would detect this surge and cut off the power supply to the electrical outlet in order to prevent a fire or other harmful effects. However, until the flow of current passes this threshold, the electrical outlet has a constant supply of power.

The electricity provided at the electrical outlet does not begin to flow until there is a completed connection from the hot slot to the neutral slot. For example, when a household appliance, such as a vacuum, is plugged into the electrical outlet, the connection is completed. The electricity flows from the hot slot, through the vacuum to run the motor, and back to the neutral slot. A further example may include a light bulb that is plugged into the outlet. The electricity will flow from the hot slot, through the filament, and back to the neutral slot, creating light in the process.

Power consumption by various devices can become a substantial expense for individuals and businesses. Lights may be left on in an unoccupied room, inefficient heaters may consume more power than necessary, etc. Similarly, many individuals forget to turn off appliances when they are finished using them. These appliances continue to consume power when they are left unattended. Further, current electrical systems also cause inconveniences when they shutdown entire circuits due to overload. Power outages can even cause damage to computer systems and other electrical equipment.

Almost all parents of young children have at some point worried about their child's safety around electrical outlets in the home. The outlets are usually installed at a height at or near a child's eye level, and a child's curiosity draws them to explore. A child may insert an object into the slots of the outlet and complete the connection between the hot slot and the neutral slot. Electricity may then flow through the child. The results of electrocution from these electrical outlets can be fatal. Many of the home electrocution and shock injuries involve unsupervised children. There are a few protective measures currently available in the art that can be taken to avoid injury or death to a child.

The most common protective measure is a plastic outlet protector. The plastic protector includes two prongs that fit directly into the outlet slots, preventing the insertion of foreign objects. However, these plastic plug inserts are inconvenient for several reasons. They are hard to put in and pull out (by design). When someone wants to plug something into the electrical outlet they typically leave the plug insert lying around somewhere close to the outlet, like on the floor nearby, where it now turns into a choking hazard. The plastic inserts are also easy to misplace. Some toddler age children may also discover how to remove these plastic protectors themselves.

Based upon the current disadvantages and problems with current electrical systems in the art, it would be beneficial if improvements were made to provide improved methods of power consumption, improved safety measures, and improved convenience practices to individuals and businesses. Specifically, it would be beneficial to only provide power to the electrical outlets and the devices connected to the electrical outlets under desirable circumstances.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
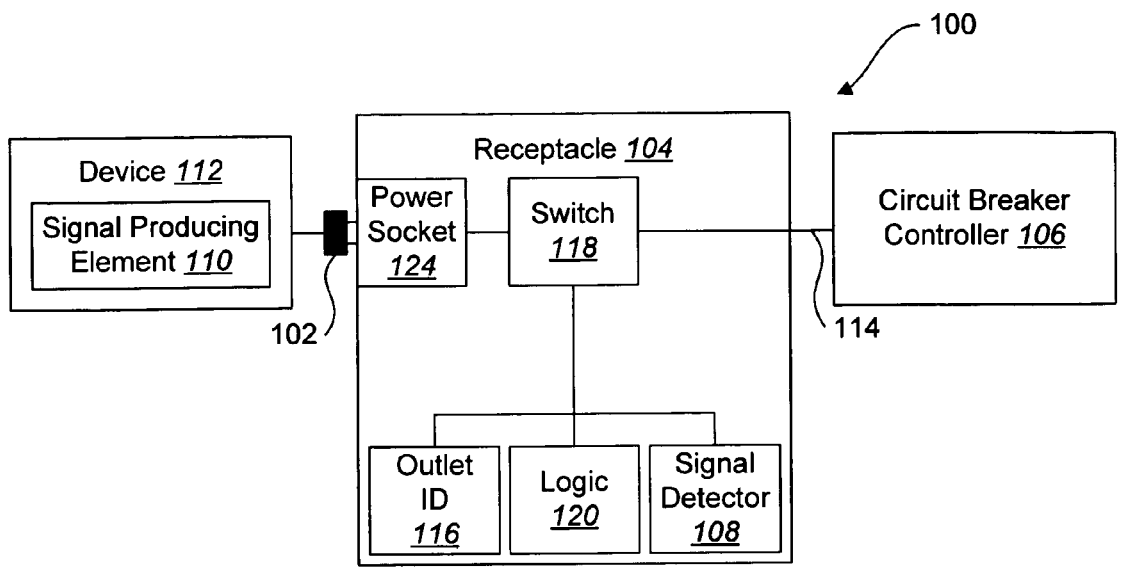
FIG. 1 is a block diagram of an embodiment of a system for selectively controlling electrical power receptacles using power profiling.

A system for selectively controlling electrical outlets using power profiling is disclosed. There is a plurality of electrical outlets that each comprise a power socket capable of receiving a plug, an outlet identification and a switch that when in a first position no power is available at the power socket, and when the switch is in a second position power is available at the power socket. A controller is in electronic communication with the plurality of electrical outlets. The controller includes a processor and memory in electronic communication with the processor. The controller also includes power profiles and operates to receive data from an electrical outlet of the plurality of electrical outlets. A device or class of device is identified based on the received data. A power profile is identified based on the received data. Action is taken based on the power profile.

In certain embodiments, taking action may comprise starting a timer. Taking action may also comprise sending a command to the electrical outlet. The command causes the switch to be in the first position such that no power is available at the power socket. The command may also cause the switch to be in the second position such that power is available at the power socket.

An electrical outlet may include a signal detector for receiving a signal from a signal producing element. The signal detector may be implemented in various ways. For example, the signal detector may include an RFID reader. The signal detector may also include a barcode reader. The signal detector may also be used for receiving commands from the controller.

The controller may include rules for determining allowed power use by devices. The device or the class of device may be stored in a device database. The outlet identification may be obtained from the received data. The controller may also start a timer based on a first device that was identified, wait for time to expire on the timer and then send a command to the electrical outlet when the time expires that causes the switch to go from the second position to the first position such that no power is available at the power socket.

The controller may allow user input to be entered to store user preferences and to add new rules. The controller may further include a network interface to connect to a computer network in order to download updated power profiles.

The controller may receive inputs from a variety of sources. For example, inputs may be received from a lighting controller system to be used in determining a next action. Additionally, inputs may be received from a security controller system to be used in determining a next action.

An electrical plug adapter for enabling a device to be used with a system for selectively controlling electrical outlets using power profiling is also disclosed. The adapter includes one or more holes for receiving one or more contacts from a plug. The adapter also includes a signal producing element that produces a signal to be used in combination with an electrical outlet that is configured for use with a system for selectively controlling electrical outlets using power profiling. The signal producing element produces a signal that allows the electrical outlet or a controller to identify the specific device or class of device.

A controller for selectively controlling electrical devices using power profiling is also disclosed. The controller includes a processor and memory in electronic communication with the processor. The controller includes an interface for communications with a plurality of electrical devices or outlets. The controller also includes power profiles and operates to receive data from an electrical device or outlet of the plurality of electrical devices or outlets. A device or class of device is identified based on the received data. A power profile is identified based on the received data. Action is taken based on the power profile.

In some embodiments the data is received from an electrical device that is not receiving power through an outlet. Furthermore, the action taken based on the power profile may include dimming a light.

An electrical outlet for use with a system for selectively controlling electrical outlets using power profiling is disclosed. The outlet includes a power socket capable of receiving a plug and a switch that when in a first position no power is available at the power socket, and when the switch is in a second position power is available at the power socket. The outlet also includes an outlet identification. A signal detector is capable of detecting a signal from the plug, is capable of sending the signal and the outlet identification to a controller, and is capable of receiving a command from the controller. The signal detector is in electrical communication with the switch such that when the signal detector receives a power off command from the controller, the signal detector causes the switch to be in the first position. When the signal detector receives a power on command from the controller, the signal detector causes the switch to be in the second position.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

The embodiments herein provide automated methods for conserving electricity, improving safety, and improving the convenience of electrical systems in homes, businesses, etc. The systems and methods herein utilize knowledge of each device plugged or wired into the electrical system. An intelligent electrical master controller uses this knowledge to monitor and control the behavior of the electrical system.

The present systems and methods may help conserve power. For example, by monitoring power usage by device, people can change their behavior in order to conserve electricity. For example, if a report showed that a large part of the power bill is due to power used by an old electrical heater, use of the heater could be curtailed or a newer, more efficient model could be purchased. Similarly, if the report showed that lights in a particular room are heavily used, people could target their efforts to remember to turn those lights off, or to sometimes use smaller lamps instead.

Using knowledge of what types of devices are connected, this system could intelligently curtail or shutdown power to lights, battery chargers, curling irons or other appliances based on a power profile for each device or class of devices combined with a user's preferences. For example, a curling iron is typically used for 15 minutes or less. The system could shutdown power to the curling iron if it is left on for more than 15 minutes. Similarly, the system could dim lights that have been left on for a period of time and turn them off after another period of time.

The present systems and methods could be used to improve safety. Many fires are started by unattended or faulty electrical appliances. These conditions could be monitored and shutdown by this system. For example, suppose a device usually uses 50 Watts of power, but suddenly begins to use 500 Watts. This could indicate a short circuit or other malfunction, and the system could cut power immediately. Similarly if a curling iron were left on, it could be turned off after a period of time.

The present systems and methods could be used to improve convenience. Current electrical systems cause inconveniences when they shutdown entire circuits due to overload. Power outages can even cause damage to computer systems and other electrical equipment. This system could shutdown specific outlets and curtail power to non-essential devices in an intelligent way, causing fewer electrical outages.

One of the tasks which the present systems need to accomplish is to determine which devices are plugged in, and where these devices are plugged into the electrical system. For hardwired systems such as stoves, lights, etc. this is known at installation time. In order for the system to work most effectively, these items should be installed on different circuits than the electrical outlets. This allows the system to control a circuit that lights the family room for example, without interfering with its outlets. Several different techniques are disclosed herein to identifying a particular device that has been plugged into a receptacle. In one implementation, an RFID (Radio Frequency Identification) chip is built into the device. This RFID is read by the outlet when the device is plugged in, uniquely identifying the device. In other embodiments, an RFID chip is built into an adapter that is plugged onto the end of the cord of a "legacy device," enabling compatibility with the system. In another example, a "power signature" is sensed for the first few seconds (or some time period) of the device's operation and matched against a stored set of power signatures (the signature could include a combination of the current drawn over time and electrical "noise" on the line). Sometimes this could match a specific device, but more often it could probably match a class (or type) of devices, which is still useful. Another implementation may use a barcode printed or etched into the plug that is read by the outlet. Alternatively the barcode may be placed onto an adapter.

Generally speaking, systems and methods for selectively controlling individual power receptacles or outlets include an intelligent master electrical controller (a smart circuit breaker). This may be a combination of a home PC and modified circuit breaker, or could all be built into a single device. A single device may be configured to export data and receive control and configuration instructions. Modified electrical power receptacles or outlets would identify each device that is plugged into the outlet.

FIG. 1 is a block diagram of an embodiment 100 of a system for selectively controlling electrical power receptacles 104 (outlets) using power profiling. An electrical plug 102 is shown proximate a power socket 124 of the receptacle 104 (also known as an outlet). A circuit breaker controller 106 for selectively controlling electrical power receptacles 104 using power profiling is in electronic communication with the receptacle 104. The receptacle 104 is connected to the circuit breaker controller 106 by a wire 114. The circuit breaker controller 106 enables, disables or otherwise controls the power at the receptacle 104 by activating or deactivating a switch 118 within the receptacle 104. The electricity supply wire 114 provides power. The switch 118 operates to provide power to the power socket 124 or turn the power off to the power socket 124, depending on instructions from the circuit breaker controller 106 and/or from any outputs from the logic 120. In some embodiments a relay may be used for the switch.

In certain embodiments the switch 118 may comprise a variable style dimmer switch. Thus, it is possible that the switch may allow more than simply turning devices on and off. With a variable style dimmer switch additional control may be provided.

The receptacle 104 also includes an outlet identification 116. For example, the identification 116 is a unique identifier for each receptacle 104 that may be located in a home, business, commercial warehouse, etc.

The electrical receptacle 104 or wall outlet 104 shown in FIG. 1 includes one socket 124, the power socket 124. The power socket 124 is configured to mate with the plug 102, as is known in the art, to provide power to the plug 102.

Different kinds of plugs and sockets may be used with the embodiments herein. Although the embodiments herein illustrate an American 2-pin plug, other kinds of plugs may be used including, but not limited to, an American 3-pin, a European 2-pin, an old British 3-pin, a French 2-pin, a German 2-pin, an Israeli 2-pin, etc. Any kind of plug/socket may be used to implement the embodiments illustrated herein.

The receptacle 104 may further include a signal detector 108 that is paired with a signal producing element 110 embedded in a device 112. The signal producing element 110 transmits information to the signal detector 108. The information may include an identification of the device 112 or an identification of the class of devices the device 112 belongs to. For example, the signal producing element 110 may transmit information to the signal detector 108 that the device is a certain household appliance (such as a vacuum). The plug 102 may function as a low power antenna to transmit the signal from the signal producing element 110 to the signal detector 108. The signal is transmitted to the signal detector 108 when the plug 102 is plugged into the power socket 124 of the receptacle 104.

If necessary, the signal detector 108 may demodulate the signal and transmit the information to the circuit breaker controller 106. The outlet identification 116 may also be transmitted to the circuit breaker controller 106. The circuit breaker controller 106 becomes aware of the type (or class) of device 112 that is plugged into the receptacle 104. Depending on certain parameters for the device 112, the circuit breaker controller 106 may then activate or deactivate the power supply to the receptacle 104.

In one embodiment, the receptacle 104 may include logic 120. The logic 120 may be configured to activate or deactivate the switch 118 depending on the information contained in the signal 110. The logic 120 allows the power supply to be enabled or disabled without transmitting the information regarding the device 112 to the circuit breaker controller 106. The logic 120 also has some limited processing capability but typically does not include the processing power found in conventional computing devices (e.g., desktop computers or notebook computers).

Figure 2:
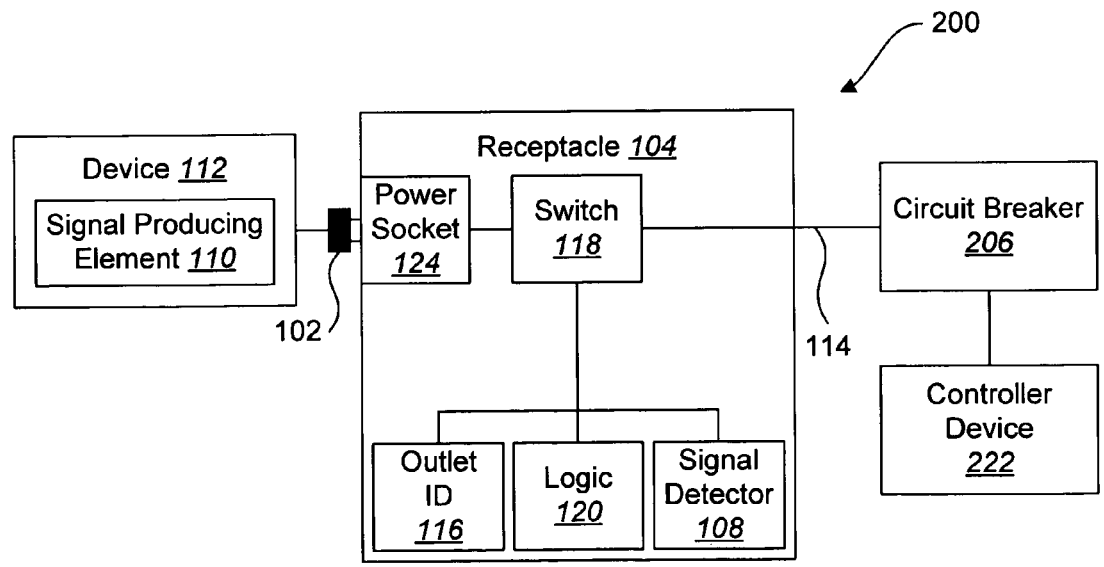
FIG. 2 is a block diagram of another embodiment of a system for selectively controlling electrical power receptacles using power profiling.

FIG. 2 is a block diagram of another embodiment 200 of a system for selectively controlling electrical power receptacles 104 (outlets) using power profiling. In the embodiment of FIG. 2, the circuit breaker 206 is separate and distinct from a controller device 222. The controller device 222 may include a personal computing device. The circuit breaker 206 receives the information regarding the device 112 in a similar manner as described in FIG. 1. The circuit breaker 206 transmits this information to the controller device 222. The controller device 222 may then transmit instructions to the circuit breaker 206 to enable or disable the power supply to the receptacle 204 depending on the information regarding the device 212. The circuit breaker 206 and the controller device 222 may communicate wirelessly such that the controller device 222 is off-site with respect to the circuit breaker 206. In addition, the controller device 222 may comprise a personal computer equipped with an interface card (not shown in FIG. 2) through which the controller device 222 communicates with the circuit breaker 206 and the power receptacles 104.

Figure 3:
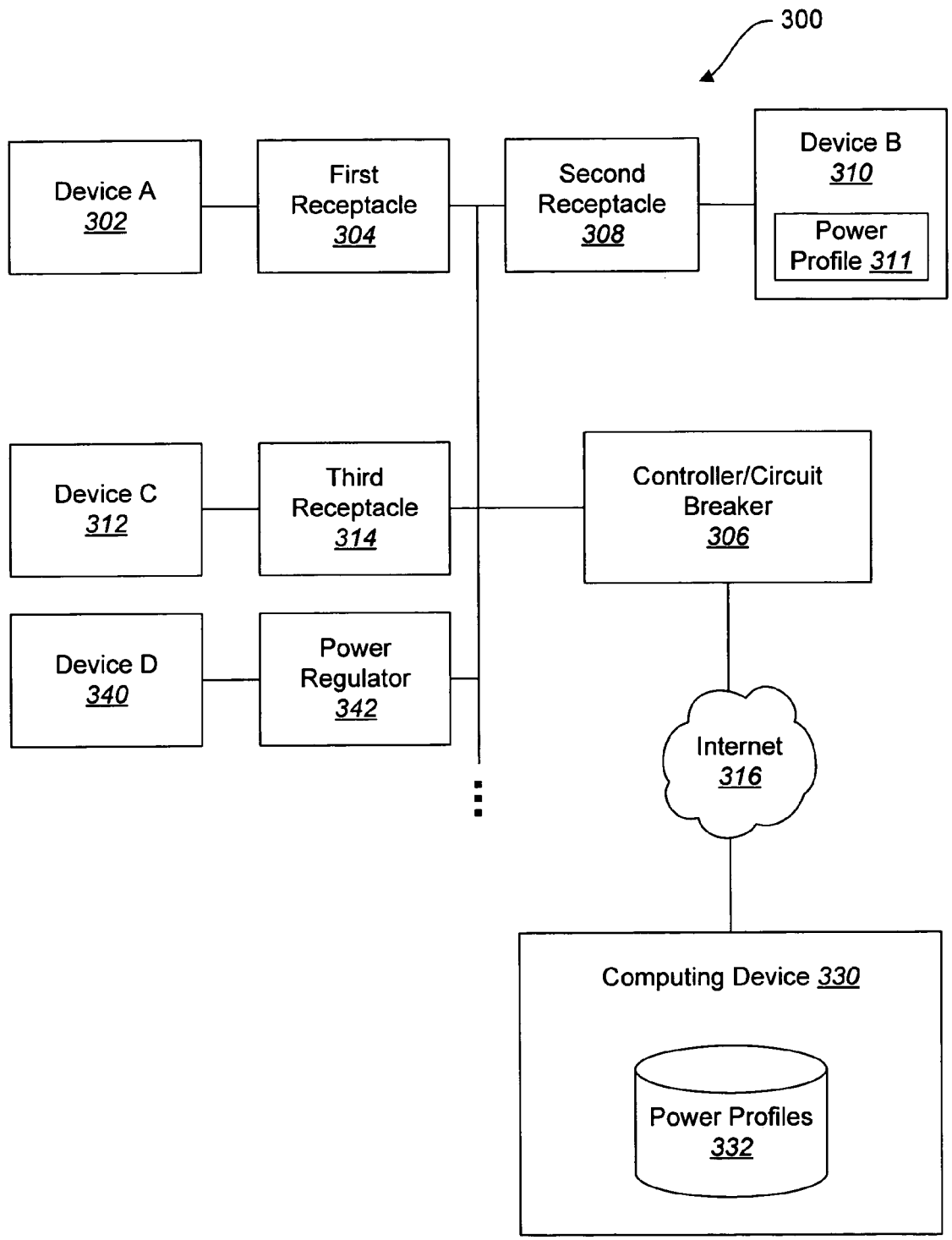
FIG. 3 is a block diagram illustrating another embodiment of a system for selectively controlling electrical power receptacles using power profiling where multiple devices and receptacles are shown.

FIG. 3 is a block diagram illustrating another embodiment 300 of a system for selectively controlling electrical devices and electrical power receptacles using power profiling where multiple devices and receptacles are shown. The home network 300 includes multiple receptacles 304, 308, 314 and multiple devices 302, 310, 312. Each receptacle in the network 300 may be connected to the circuit breaker controller 306. This embodiment 300 illustrates that many receptacles and many devices may be used with the systems and methods disclosed herein. Thus, in a home or commercial building, one embodiment may selectively control all of the electrical power receptacles using power profiling.

FIG. 3 also illustrates that the present systems and methods may be used to control devices that are hard-wired into the home, office, etc. For example, many lights are not plugged into a receptacle but are directly wired for power. In addition, FIG. 3 also shows that the systems may also regulate power to a device which gives more control than simply turning a device on and off. Device D 340 is a device that is hard-wired into the home and is not plugged into a receptacle. An example of Device D 340 is a set of lights in a room. A power regulator 342 is placed on the network 300 such that it 342 can control the power to device D 340. The power regulator 342 may include components similar to that of a receptacle 104 such as an ID 116, logic 120 and a signal detector 108, if needed. For the sake of clarity these items are not illustrated in FIG. 3. However the power regulator 342 operates differently than the switch 118 because it 342 not only allows on and off, but it also allows various levels of powers to be given to the device 340. Thus, with the power regulator 342 it is possible to dim lights, rather than simply turning them off.

FIG. 3 further illustrates that a power profile 311 may be stored on the device 310 itself. It is possible that device manufacturers, or others, could embed a power profile 311 for a specific device 310 on the device 310. With this particular embodiment of a device 310, the circuit breaker controller 306 may simply download the profile 311 from the device 310.

The circuit breaker controller 306 may be connected to the Internet 316. Through the Internet 316 the circuit breaker controller 306 may have access to additional computing devices 330, which may be able to provide additional power profiles 332. In such a scenario updated power profiles 332, or new power profiles 332 for new devices, may be downloaded and used by the controller 306.

The circuit breaker controller 306 may receive information from the Internet 316 regarding the power profiles or power signatures for device A 302, device B 310, and device C 312. The power profiles or power signatures may include the power thresholds for each device in the network 300. For example, device A 302 may include a standard curling iron. The circuit breaker controller 306 may receive information from the Internet 316 that the standard curling iron should not exceed 1000 Watts. If device A 302 is a standard curling iron and is plugged into the first receptacle 304, the identification of the device A 302 is transmitted to the first receptacle 304. The first receptacle 304 transmits the identification of the device A 302 as well as the identification of the first receptacle 304 to the circuit breaker controller 306. If the device A 302 experiences a short circuit, there may be a surge of power to the device A 302 that surpasses 1000 Watts. The circuit breaker controller 306 may disable the power supply to the first receptacle 304.

The circuit breaker controller 306 may also be configured to only access the Internet when necessary, or at certain intervals. For example, if the circuit breaker controller 306 included all the power profiles that were needed at that location, there may be no need to connect to the Internet 316. However, if a new device (not shown) were connected that the circuit breaker controller 306 did not have a power profile for, the circuit breaker controller 306, at that point, may connect to the Internet 316 and try to find the needed power profile 332, or at least an updated set of power profiles 332.

Figure 4:
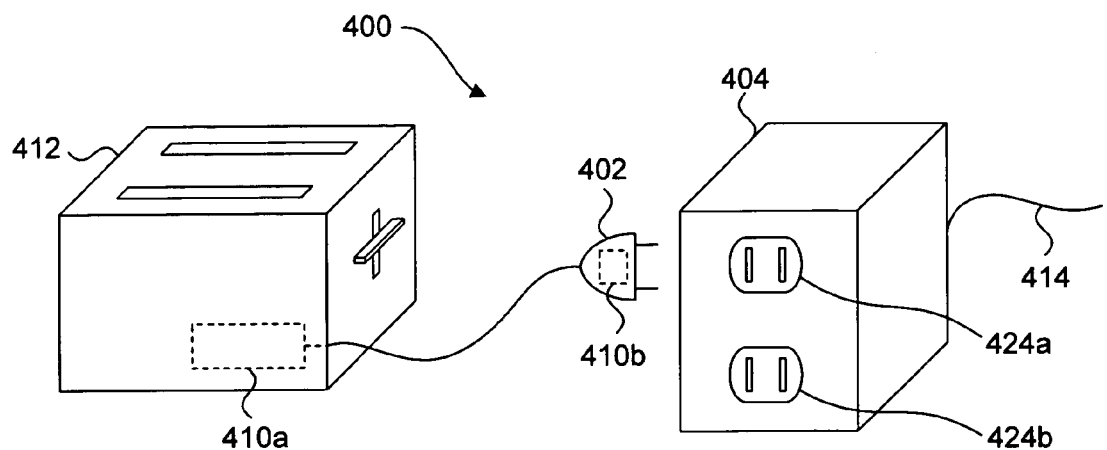
FIG. 4 illustrates a home appliance system that may be configured with a receptacle to operate with the present systems and methods.

FIG. 4 illustrates a home appliance system 400 that may be configured with a receptacle 404 to operate with the present systems and methods. The receptacle 404 includes two power sockets 424a, 424b. A power supply wire 414 provides power to the receptacle 404. The system 400 illustrates a device 412 such as a household toaster. As illustrated, the signal producing element 410a may be embedded in the device 412. In a further embodiment, the signal producing element 410b may be embedded in the plug 402. Although FIG. 4 illustrates both locations of possible signal producing elements 410a, 410b, typically only one signal producing element 410 will be present on or at a device 412. The signal producing element 410 may transmit information to the embedded system within the receptacle 404 as described herein.

Figure 5:
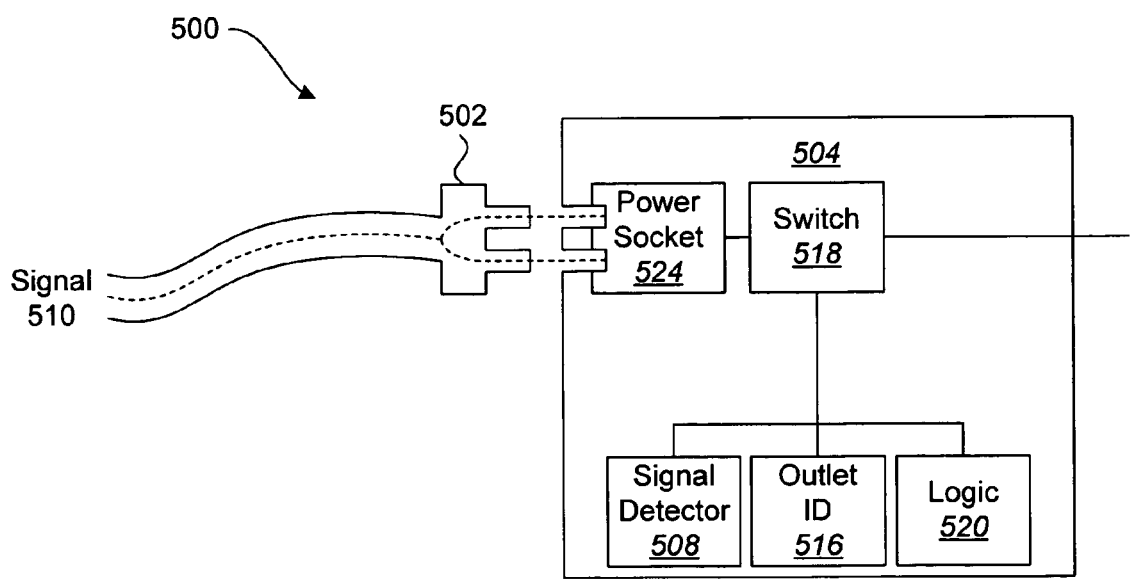
FIG. 5 illustrates one embodiment of the signal being transmitted to the receptacle.

FIG. 5 illustrates one embodiment 500 of the signal 510 being transmitted to the receptacle 504. As previously described, the plug 502 may function as a low power antenna to transmit the signal 510. The plug 502 may be plugged into the receptacle 504 by connecting the plug 502 to a power socket 524. The signal 510 may then pass to the signal detector 508 within the receptacle 504. The signal detector 508 may demodulate the signal 510 or otherwise interpret the signal 510. The information contained within the signal 510 may then be transmitted to the circuit breaker controller (not shown in FIG. 5) along with the outlet identification 516.

The circuit breaker controller 106 may activate or deactivate the switch 518 in order to provide or discontinue power to the power socket 524 of the receptacle 504. The circuit breaker controller 106 analyzes the information contained in the signal 510 to determine if the power supply should be active or inactive at the power socket 524. In one embodiment, the signal 510 is received by the logic 520. The logic 520 may then enable or disable the power supply by activating or deactivating the switch 518. In some embodiments the logic 520 may have some limited capabilities to make certain power decisions, but for the most part may rely on the intelligence of the circuit breaker controller 106 to make power decisions.

Generally speaking, if RFID chips were used as the signal producing elements 110, modified electrical outlets 104 would need to be able to read the RFID number. These would need to work differently than traditional RFID readers, which work wirelessly, since they should only read the device that is plugged in. This should be possible by using the electrical plug 102 as an antenna, shielding the RFID chip in the device, and using a low-power reader which uses the electrical power socket and plug 102 as an antenna.

Figure 6:
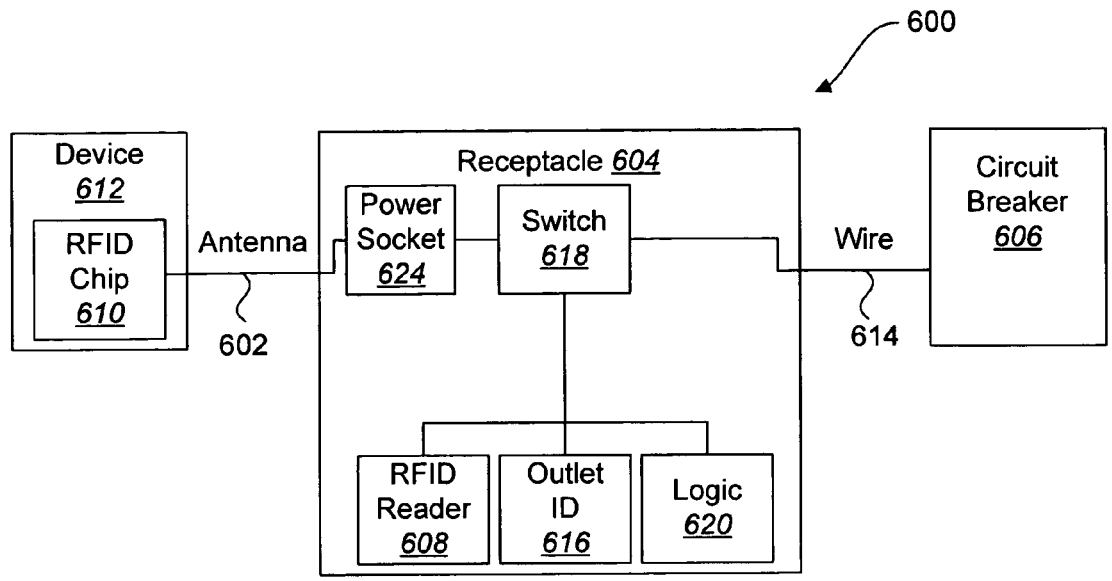
FIG. 6 illustrates an embodiment of an RFID (Radio Frequency Identification) chip serving as the signal producing element.

FIG. 6 illustrates an embodiment 600 of an RFID chip 610 (Radio Frequency Identification) serving as the signal producing element 610. The RFID chip 610 may be embedded in the device 612 such that the signal emitted from the RFID chip 610 is shielded from being read by additional receptacles. For example, the device 612 may be plugged into the power socket 624 of a particular receptacle 604. The plug 602 is a low power antenna and once the plug 602 is connected to the power socket 624, the RFID chip 610 emits a signal that is transmitted via the plug 602. If the signal emitted from the RFID chip 610 was not shielded, receptacles in the vicinity of the area might read the signal and provide information to the circuit breaker controller 106 about the device 612 as well as the outlet identification for the receptacle even though the device 612 was not plugged into that specific receptacle.

Once the device 612 is connected to the receptacle 604, an RFID reader 608 may receive and demodulate the signal from the RFID chip 610. The information from the RFID chip 610 may then be transmitted to the circuit breaker controller 606 by a wire 614. In addition to the information from the RFID chip 610, the outlet identification 616 for the receptacle 604 that is connected to the device 612 is also transmitted to the circuit breaker controller 606. The information may be transmitted to the circuit breaker controller 606 through a variety of means and by a variety of protocols including, but not limited to, X10, TCP/IP, wireless transmission, etc.

Based on the information from the RFID chip 610, the circuit breaker controller 606 becomes aware of the specific device 612 that is plugged into the particular receptacle 604. The controller 606 may then enable or disable the power supply to the power socket 624 by activating or deactivating the switch 618. In one embodiment, the controller 606 accesses the power profiles or power signatures for the specific device 612 as explained in FIG. 2. For example, if the power being supplied to the device 612 exceeds the power threshold specified in the power profile, the controller 606 may deactivate the switch 618 thereby disabling the power supply to the receptacle 604.

Figure 7:
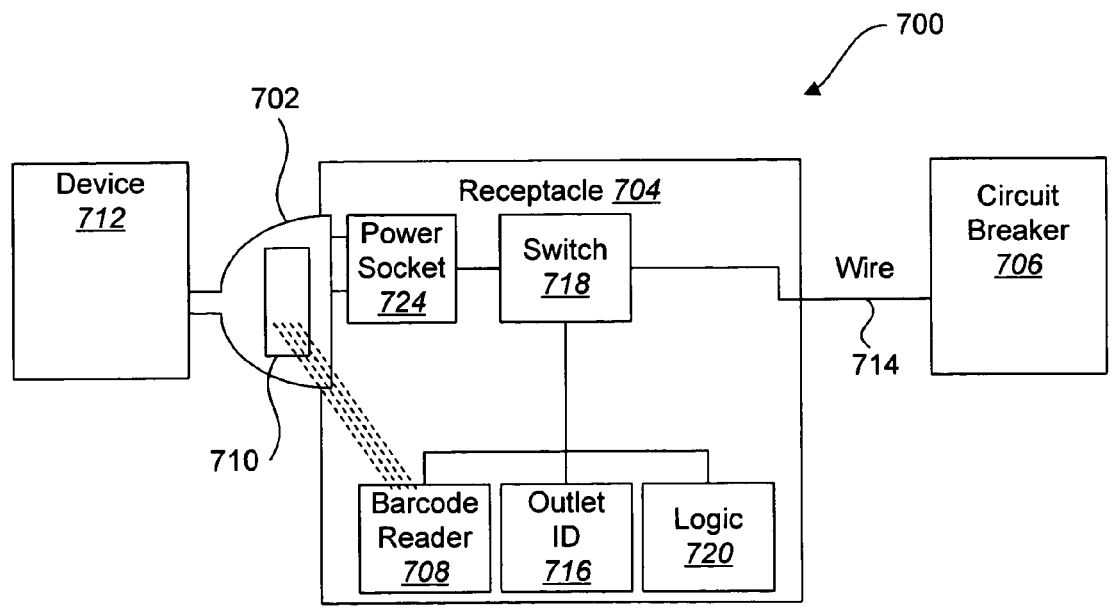
FIG. 7 illustrates an embodiment where a barcode serves as the signal.

FIG. 7 illustrates an embodiment 700 where a barcode 710 serves as the signal 710. The barcode 710 may be etched or printed on the plug 702 such that a barcode reader 708 may read the barcode 710 when the plug 702 is connected to the power socket 724.

Once the device 712 is connected to the receptacle 704 by way of the power socket 724, the barcode reader 708 may interpret the information contained in the barcode 710. The information may then be transmitted to the circuit breaker controller 706 by a wire 714. In addition to the information from the barcode 710, the outlet identification 716 for the receptacle 704 that is connected to the device 712 is also transmitted to the circuit breaker controller 706.

Based on the information from the barcode 710, the circuit breaker controller 706 becomes aware of the specific device 712 that is plugged into the particular receptacle 704. The controller 706 may then enable or disable the power supply to the power socket 724 of the receptacle 704 by activating or deactivating the switch 718. In one embodiment, the controller 706 accesses the power profiles or power signatures for the specific device 712 as explained in FIG. 2. For example, if the power being supplied to the device 712 exceeds the power threshold specified in the power profile, the controller 706 may deactivate the switch 718 thereby disabling the power supply to the power socket 724.

With the aforementioned examples, manufacturers would construct the signal producing element 110 into their devices 112 or into their plugs 102 (e.g., a barcode, an RFID chip, etc.). However, there will be a number of plugs that were not manufactured with these signal producing elements 110. The following embodiments provide a way to enhance existing devices and plugs to work with the present embodiments.

Figure 8:
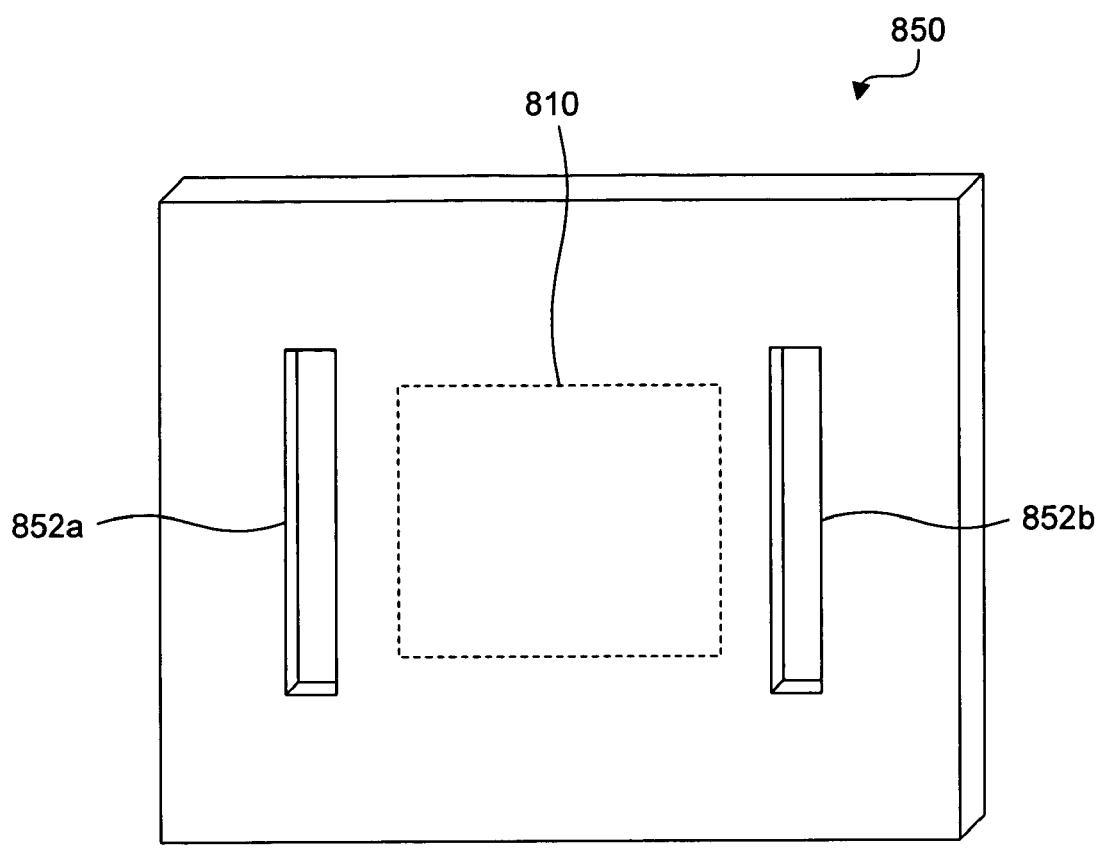
FIG. 8 is an illustration of a plug adapter.

FIG. 8 is an illustration of a plug adapter 850 that is plugged onto the end of the cord of a "legacy device," enabling compatibility with the system. The plug adapter 850 is thin enough such that it can be placed onto an existing plug but still allow the plug to be inserted into the slots of the power socket (not shown in FIG. 8). The adapter 850 includes holes 852a, 852b to allow the existing contacts of a plug (not shown in FIG. 8) to pass therethrough. The adapter 850 has the signal producing element 810. When the adapter 850 is placed onto a plug 102, the plug 102 will operate to transmit a signal to the receptacle (not shown in FIG. 8).

Figure 9:
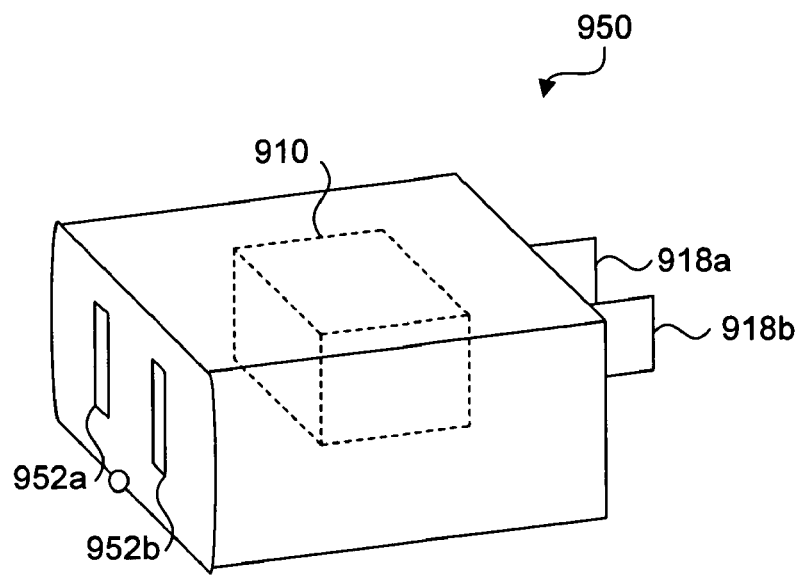
FIG. 9 is an illustration of another embodiment of a plug adapter.

FIG. 9 is an illustration of another embodiment of a plug adapter 950 that is plugged onto the end of the cord of a "legacy device," enabling compatibility with the system. The plug adapter 950 in FIG. 9 is a socket in itself in which the plug 102 (not shown in FIG. 9) is inserted. The plug adapter 950 includes its own contacts 918a, 918b as well as a signal producing element 910. A plug 102 that needed to be enhanced is simply plugged into this adapter 950, which is in turn plugged into the power socket of the receptacle. The plug 102 then proceeds to transmit the signal from the signal producing element 910.

Figure 10:
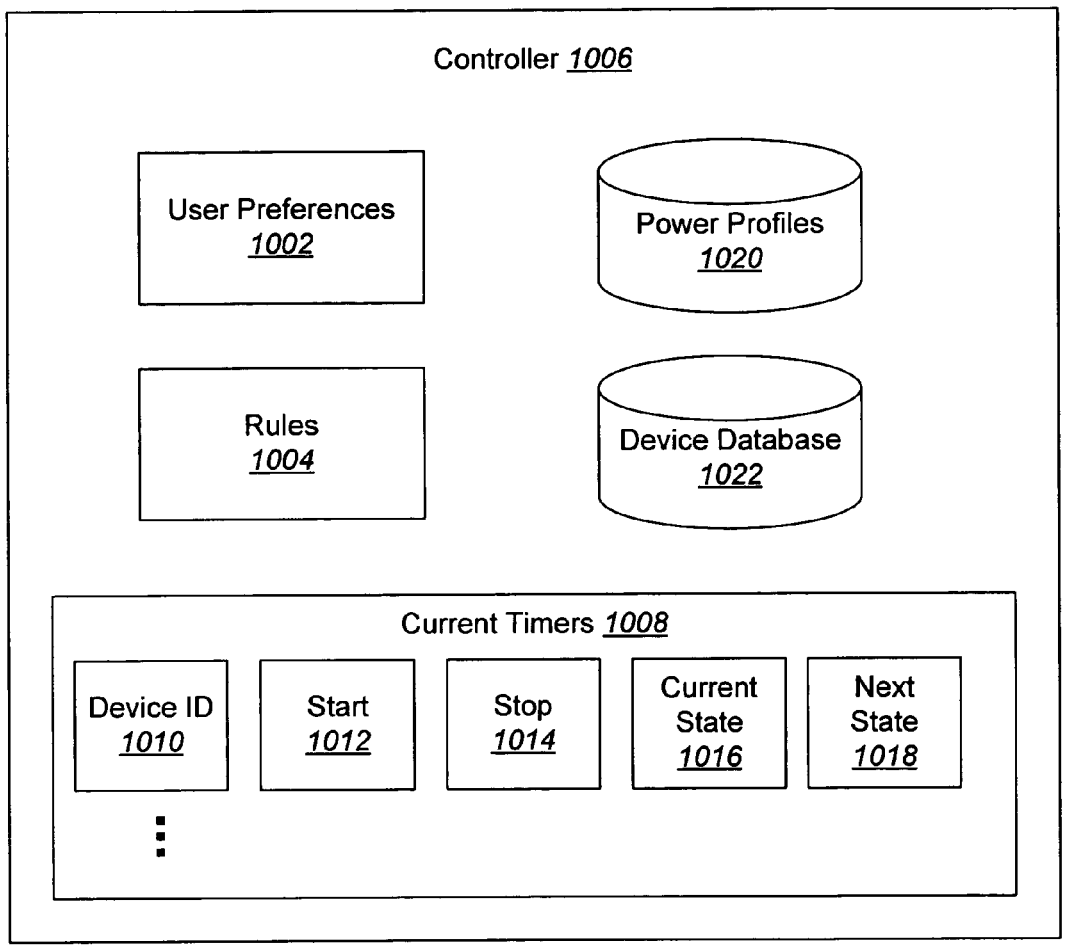
FIG. 10 is an illustration of one embodiment of a controller.

FIG. 10 illustrates one embodiment of a controller 1006 that may be used in accordance with the present systems and methods. The controller 1006 provides commands to activate or deactivate the switch 118 within the receptacle 104, thus enabling or disabling the power supply to the power socket(s) 124 of the receptacle 104. The controller 1006 includes user preferences 1002 that allow a user of the controller 1006 to specify certain functions for certain devices 112. For example, the user preferences 1002 might include information relating to appliances typically used in the bathroom (curling iron, hair dryer, electric razor, etc.) The user preferences 1002 might indicate that if such appliances are plugged into a receptacle 104 anywhere in the home for more than a certain period of time, the controller 1006 should disable the power supply to the power socket 124 that is connected to such a device.

The controller 1006 may also include a set of rules 1004 for each device 112 that may be plugged into a receptacle 104.

The rules 1004 describe the manner in which certain devices 112 behave or how they are to be treated with respect to power consumption. For example, the rules 1004 may, for each device or for each type of device, include a range of acceptable power consumption, as well as the maximum time allowed of continuous power consumption. Furthermore, the rules 1004 may specify how long a curling iron, for example, is to receive power when it is connected to the receptacle 104. The user preferences 1002 may indicate that power is to be supplied to the curling iron for a period longer than specified by the rules 1002 relating to the curling iron. The power supply will be enabled or disabled to the curling iron in accordance with the rules 1002 relating to the curling iron. The rules 1004 may also include times of day when a particular device is allowed to operate. For example, a parent might want to restrict the use of a television or computer in a child's room during late night hours.

The controller 1006 may further include information regarding current timers 1008. In one embodiment, the current timers information 1008 includes device identification 1010, start time information 1012, stop time information 1014, current state information 1016, and next state information 1018. The device identification 1010 provides the type or class of a specific device 112 that may be plugged into a receptacle. There may be multiple devices listed under the device identification 1010 as multiple devices may be plugged into the multiple receptacles that exist in a home or business environment. For each device identification 1010, the start 1012 and stop 1014 information specify the start and stop times for the power supply to be active for the device 112 specified by the device information 1010. The current state 1016 indicates if the power supply is active or inactive for each device 112 specified by the device information 1010. Further, the next state information 1018 indicates the next state of the power supply to the device 112 after the stop time information 1014 has expired. For example, the device information 1010 may indicate a lamp. The start time information 1012 may indicate 7:00 pm and the stop time information may indicate 8:00 pm such that the power supply to the power socket 124 connected to the lamp may be active from a beginning time at 7:00 pm and an ending time at 8:00 pm. The current timers merely deactivate the switch 118 within the receptacle 104. The current state information 1016 may indicate "active" from the time of 7:00 pm to 8:00 pm while the next state information 1018 may indicate "not active." At the conclusion of the hour, the current state information will change to "not active" while the next state information 1018 changes to "active."

The controller 1006 also includes power profiles 1020 or power signatures for each device 112. The controller 1006 may access the Internet to obtain the power profiles 1020 as explained in FIG. 3. The power profiles 1020 may indicate the threshold amount of power a certain device is capable of receiving. For example, the power profile 1020 for a standard curling iron may include 850 Watts. If the curling iron experiences a short circuit while plugged into a receptacle, there may be a surge of power to the curling iron that surpasses 850 Watts. The controller 1006 may disable the power supply to the individual receptacle that is connected to the curling iron.

The power profile 1020 may also indicate the priority, or relative importance of a device's consistent access to power. For example, medical devices, smoke alarms and other essential equipment should receive top priority if the available power supply needs to be curtailed (in order to avoid overloading a circuit for example). Computer systems, telephones and lights leading to exits might receive a lesser priority, while chargers, razors, blow dryers, televisions and other lights receive a lesser priority still. This would allow the controller to intelligently choose devices to shut down in order to avoid overloading a circuit or to conserve electricity.

The device database 1022 stores information relating to the devices 112. In one embodiment, the database 1022 stores the power profiles 1020 or power signatures for each device. The database 1022 may also include a log of usage of a particular device 112 as described in FIG. 11.

Figure 11:
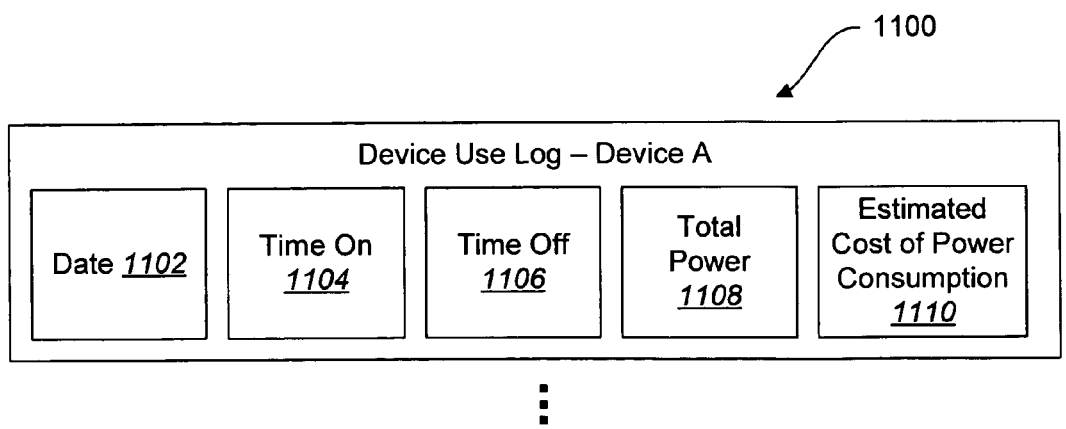
FIG. 11 is an illustration of one embodiment of a device user log designed to record the power consumption of a device.

FIG. 11 illustrates one embodiment of a device use log record 1100 that could be used in the device database 1022. The log 1100 provides the amount of power usage experienced by a certain device 112 in order for the user of the device to improve power conservation.

The log 1100 includes a date field 1102 that indicates the dates the specific device 112 consumed power. Time on 1104 and time off 1106 fields provide the times when the device 112 began to consume power and when the power consumption ended. A total power field 1108 indicates the total amount of power that the device consumed during the time frame indicated by the time on 1104 and time off 1106 fields. An estimated cost of power consumption field 1110 provides the estimated cost that a user would pay for the consumption of the power by the device 112.

A user that has access to the information contained in the log 1100 may monitor the power consumption used by a specific device 112 during a certain time period, i.e. month, day, hour, etc. The user may then modify or change his or her behavior relating to the usage of the device 112 in order to conserve electricity. For example, if the log 1100 showed that a large part of the user's power bill is due to power consumed by a certain electrical heater, use of that heater could be curtailed or a newer, more efficient model may be purchased. Similarly, if the log 1100 showed that lights in a particular room are heavily used, the user could target his efforts to remember to turn those lights off, or to sometimes use smaller lamps instead.

Figure 12:
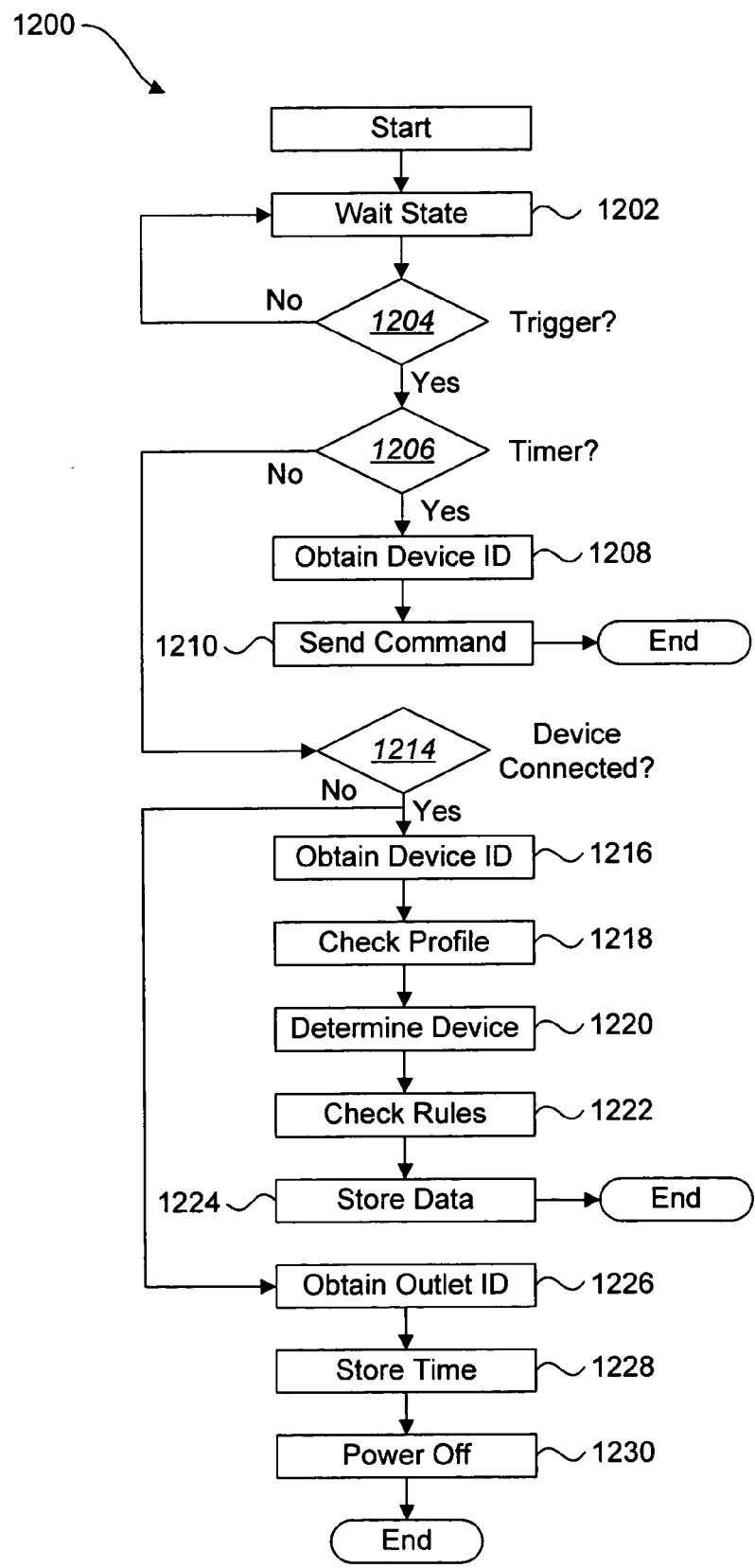
FIG. 12 is a flow chart illustrating one embodiment of a method for controlling the operation of a controller.

FIG. 12 illustrates an embodiment of a method 1200 of operation of a controller 106. The method 1200 starts and the controller remains in a wait state 1202 until a trigger is detected 1204. If a trigger is not detected 1204, the controller remains in the wait state 1202. However, if a trigger is detected 1204, the method 1200 continues and determines 1206 if the trigger is a timer trigger 1206 or a device trigger.

If the detected trigger at step 1204 is a timer trigger 1206, the method 1200 continues and obtains 1208 the device identification. The device identification is typically obtained by the receptacle and transmitted to the controller 106 along with the outlet ID 116. The device identification may be stored within the device field 1010 of the current timers table 1008 as described in FIG. 10. The method 1200 then continues and sends 1210 a command to the switch 118 in order to activate or deactivate the switch as needed. The command to activate or deactivate the switch 118 is determined by the device identification obtained as well as the timer information contained within the current timers table 1008. If the obtained device identification corresponds to a timer that has expired, the command sent 1210 to the switch 118 is a command to deactivate. In one embodiment, the circuit breaker controller 106 sends 1210 the command to the switch 118.

If the trigger detection 1204 detects a device trigger, the method 1200 determines 1214 if the device was connected or disconnected. In one embodiment, the circuit breaker controller 106 determines 1214 if the device was connected or disconnected because the signal ceases to be transmitted to the receptacle 104 when the device 112 is disconnected. Thus, if the circuit breaker controller 106 determines 1214 the device 112 is disconnected, the method 1200 continues by checking for the receptacle identification 1226. In one embodiment, the circuit breaker controller 106 obtains 1226 the outlet identification 116 as described in FIG. 1. The time the device 112 is disconnected is stored 1228 in the device database 1022 and the power supply to the receptacle 104 is disabled 1230.

If the device is connected 1214, the method 1200 continues and obtains 1216 the identification of the device 112. In one embodiment, the signal that contains the identification of the device 112 is transmitted by the plug 102 to the signal detector 108. The information with the identification of the device 112 is then transmitted to the circuit breaker controller 106. The method 1200 may then continue and check 1218 for the power profile of the device 112. As explained in reference to FIG. 10, the circuit breaker controller 106 may check 1218 the power profile of the device 112. The power profile may indicate the amount of power the specific device 112 may consume. For example, the power profile for a standard curling iron may indicate 850 watts.

If a power profile for the device 112 is present, the method 1200 continues and determines 1220 the specific type of device 112 or class of device 112 that is connected to the receptacle 104. The method 1200 also checks 1222 for rules relating to the specific device 1222. The rules may be based on the power profile and the information contained in the current timers table 1008 as described in FIG. 10. The method 1200 then stores 1224 the data regarding the specific device 112 in the device database 1022.

Figure 13:
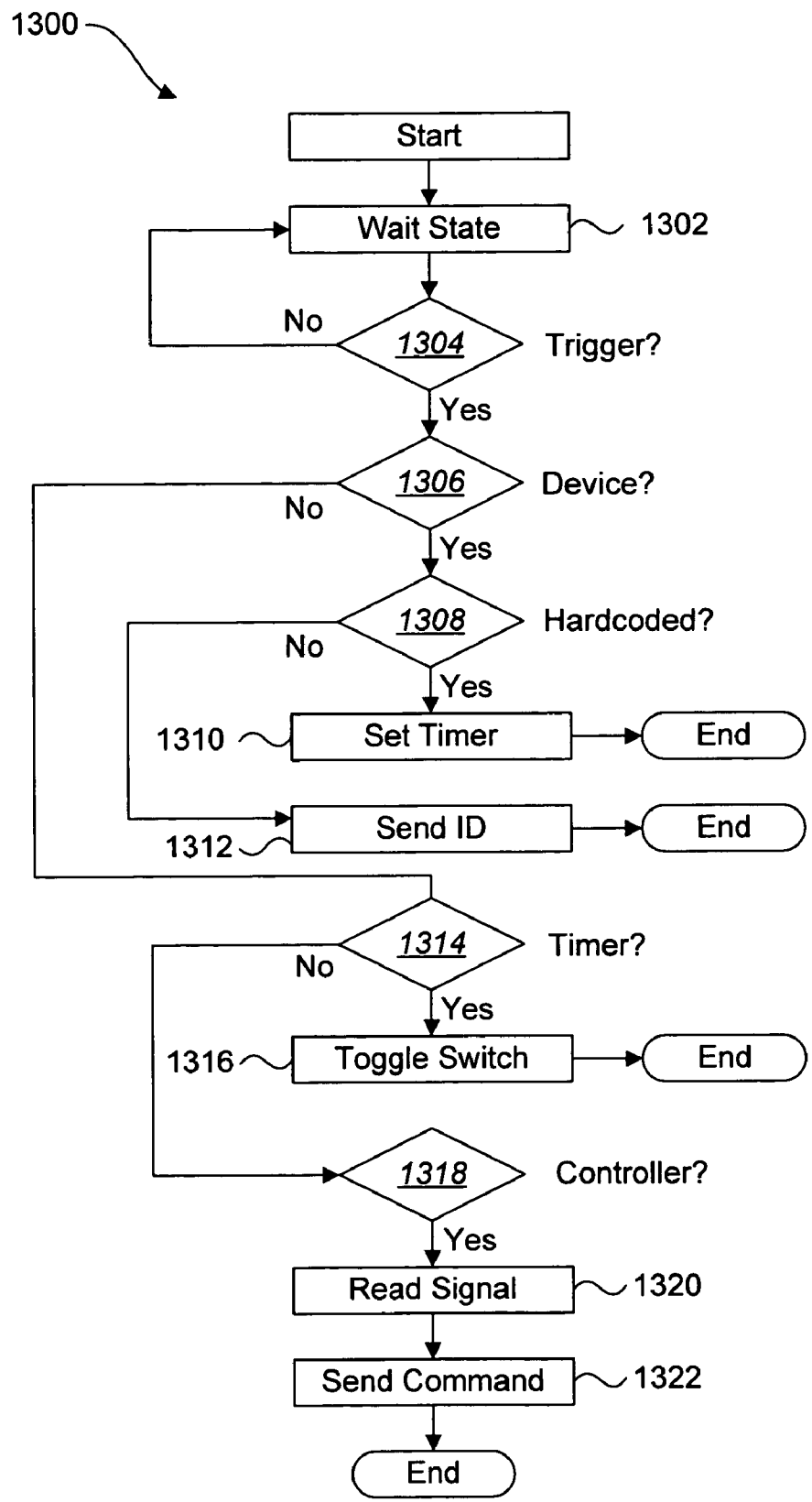
FIG. 13 is a flow chart illustrating one embodiment of a method for controlling the operation of a receptacle.

FIG. 13 illustrates one embodiment of a method 1300 of the operation of a power receptacle 104. The method 1300 begins with the receptacle 104 remaining in a wait state 1302. The method 1300 continues to determine if a trigger is detected 1304. If no trigger has been detected 1304, the receptacle remains in the wait state 1302. If a trigger has been detected 1304, the method 1300 continues to determine if the trigger is a device trigger 1306. If the trigger is a device trigger 1306, the method 1300 determines if the device identification is hardcoded 1308 in the logic 120 of the receptacle 104 as discussed in FIG. 1. If the device identification is hardcoded 1308 in the logic 120, the method 1300 continues to set 1310 a local timer within the logic 120. The local timer may be similar to the current timer table 1008 as discussed in FIG. 10.

If the device identification is not hardcoded into the logic 120 of the receptacle 104, the power receptacle 104 sends 1312 the device identification to the controller 106. The device identification is sent 1312 to the controller 106 regardless of whether the device is connecting to or disconnecting from the receptacle 104.

If the trigger is determined 1314 to be a timer trigger, the method 1300 continues by toggling 1316 the switch within the receptacle 104. In one embodiment, the switch 118 will be toggled 1316 to the active position if the previous position had been the inactive position and vice versa. Toggling 1316 the switch 118 facilitates the power supply to be enabled or disabled at the power socket 124 of the receptacle 104.

If the trigger is determined 1318 to be a controller trigger, the receptacle reads 1320 the signal sent from the controller 106. The signal may include a command to activate or deactivate the switch 118 within the receptacle 104 in order to enable or disable the power supply. The receptacle then sends 1322 the appropriate command to the switch 118.

Figure 14:
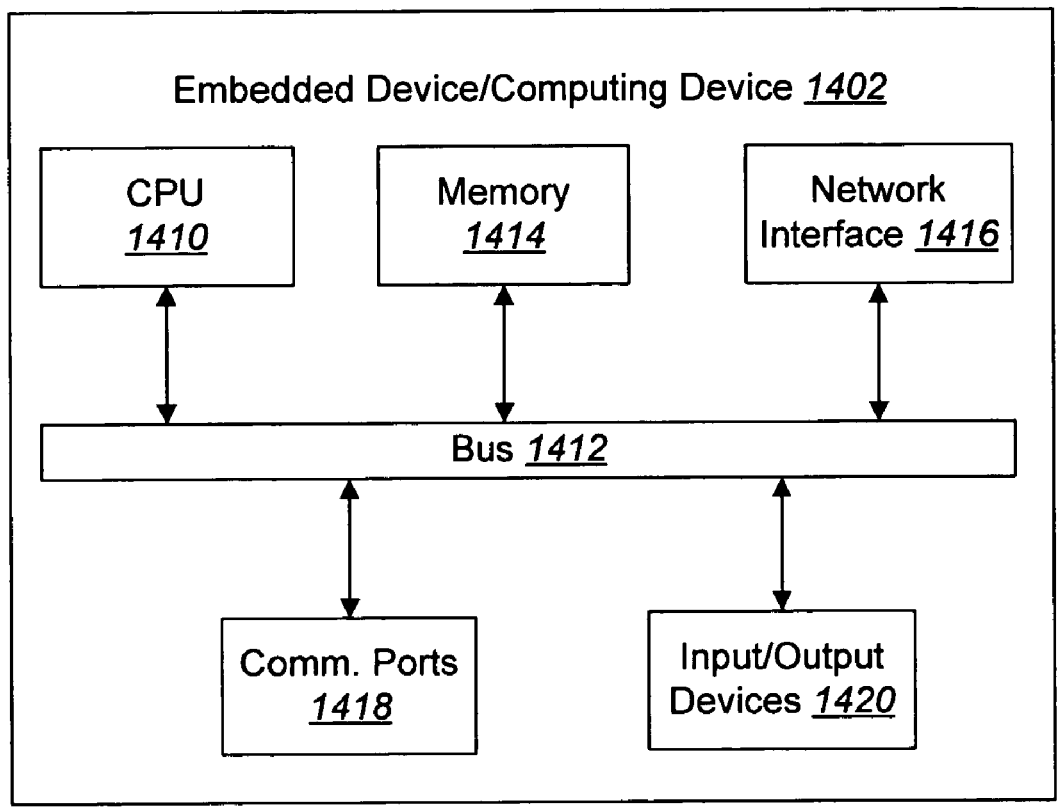
FIG. 14 is a block diagram of hardware components that may be used in an embodiment of an embedded device or computing device.

FIG. 14 is a block diagram of hardware components that may be used in an embodiment 1402 of an embedded device or computing device. Computing devices and/or embedded devices may be used in implementing the circuit breaker controller 106, the controller device 202, the receptacle 104 or other devices that need processing capability and memory.

A CPU 1410 or processor may be provided to control the operation of the embedded device 1402, including the other components thereof, which are coupled to the CPU 1410 via a bus 1412. The CPU 1410 may be embodied as a microprocessor, microcontroller, digital signal processor or other device known in the art. The CPU 1410 performs logical and arithmetic operations based on program code stored within the memory 1414. In certain embodiments, the memory 1414 may be on-board memory included with the CPU 1410. For example, microcontrollers often include a certain amount of on-board memory.

The embedded device 1402 may also include a network interface 1416. The network interface 1416 facilitates communication between the embedded device 1402 and other devices connected to the network. The network may be a powerline network, a computer network, a wireless network, a global communications network, the Internet, a telephone network, etc. The network interface 1416 may operate according to standard protocols for the applicable network.

The embedded device 1402 may also include memory 1414. The memory 1414 may include a random access memory (RAM) for storing temporary data. Alternatively, or in addition, the memory 1414 may include a read-only memory (ROM) for storing more permanent data, such as fixed code and configuration data. The memory 1414 may also be embodied as a magnetic storage device, such as a hard disk drive. The memory 1414 may be any type of electronic device capable of storing electronic information.

The embedded device 1402 may also include communication ports 1418, which facilitate communication with other devices. The embedded device 1402 may also include input/output devices 1420, such as a keyboard, a mouse, a joystick, a touchscreen, a monitor, speakers, a printer, etc.

The present systems and methods for selectively controlling electrical power receptacles 104 (outlets) using power profiling may be used in a variety of contexts. For example, a system for selectively controlling electrical power receptacles using power profiling could be used with a lighting system. In such a system the controller could use the state of the lights or switches as additional inputs for determining whether to turn on or off the power at a particular power receptacle. Similarly, with a security system the controller could use the inputs from window sensors, motions sensors, door sensors, etc. as additional inputs for determining whether to turn on or off the power at a particular power receptacle. A combined system used for home control could also utilize the present systems and methods and use the additional inputs available to determine how to control power throughout the home. The following figures generally describe the different systems that may be used with and benefit from the present systems and methods for selectively controlling electrical power receptacles using power profiling.

Figure 15:
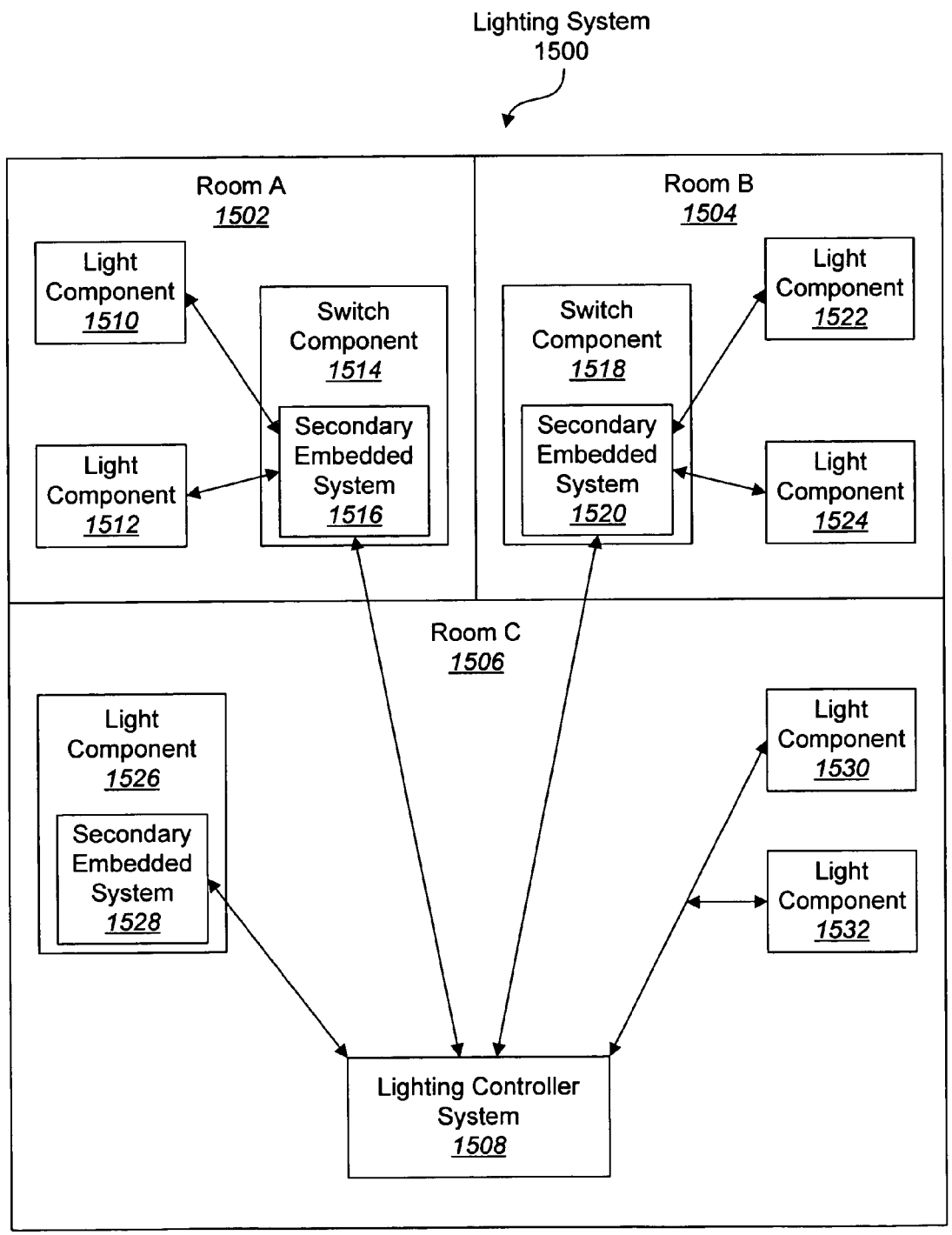
FIG. 15 is a block diagram illustrating a lighting system that may utilize the systems and method disclosed herein.

FIG. 15 illustrates one embodiment of a system wherein the present systems and methods may be implemented. FIG. 15 is a block diagram that illustrates one embodiment of a lighting system 1500 that includes a lighting controller system 1508. The lighting system 1500 of FIG. 15 may be incorporated in various rooms in a home. As illustrated, the system 1500 includes a room A 1502, a room B 1504, and a room C 1506. Although three rooms are shown in FIG. 15, the system 1500 may be implemented in any number and variety of rooms within a home, dwelling, or other environment.

The lighting controller system 1508 may monitor and control additional embedded systems and components within the system 1500. In one embodiment, the room A 1502 and the room B 1504 each include a switch component 1514, 1518.

The switch components 1514, 1518 may also include a secondary embedded system 1516, 1520. The secondary embedded systems 1516, 1520 may receive instructions from the lighting controller system 1508. The secondary embedded systems 1516, 1520 may then execute these instructions. The instructions may include powering on or powering off various light components 1510, 1512, 1522, and 1524. The instructions may also include dimming the brightness or increasing the brightness of the various light components 1510, 1512, 1522, and 1524. The instructions may further include arranging the brightness of the light components 1510, 1512, 1522, and 1524 in various patterns. The secondary embedded systems 1516, 1520 facilitate the lighting controller system 1508 to monitor and control each light component 1510, 1512, 1522, and 1524 located in the room A 1502 and the room B 1504.

The lighting controller system 1508 might also provide instructions directly to a light component 1526 that includes a secondary embedded system 1528 in the depicted room C 1506. The lighting controller system 1508 may instruct the secondary embedded system 1528 to power down or power up the individual light component 1526. Similarly, the instructions received from the lighting controller system 1508 may include dimming the brightness or increasing the brightness of the individual light component 1526.

The lighting controller system 1508 may also monitor and provide instructions directly to individual light components 1530 and 1532 within the system 1500. These instructions may include similar instructions as described previously.

Figure 16:
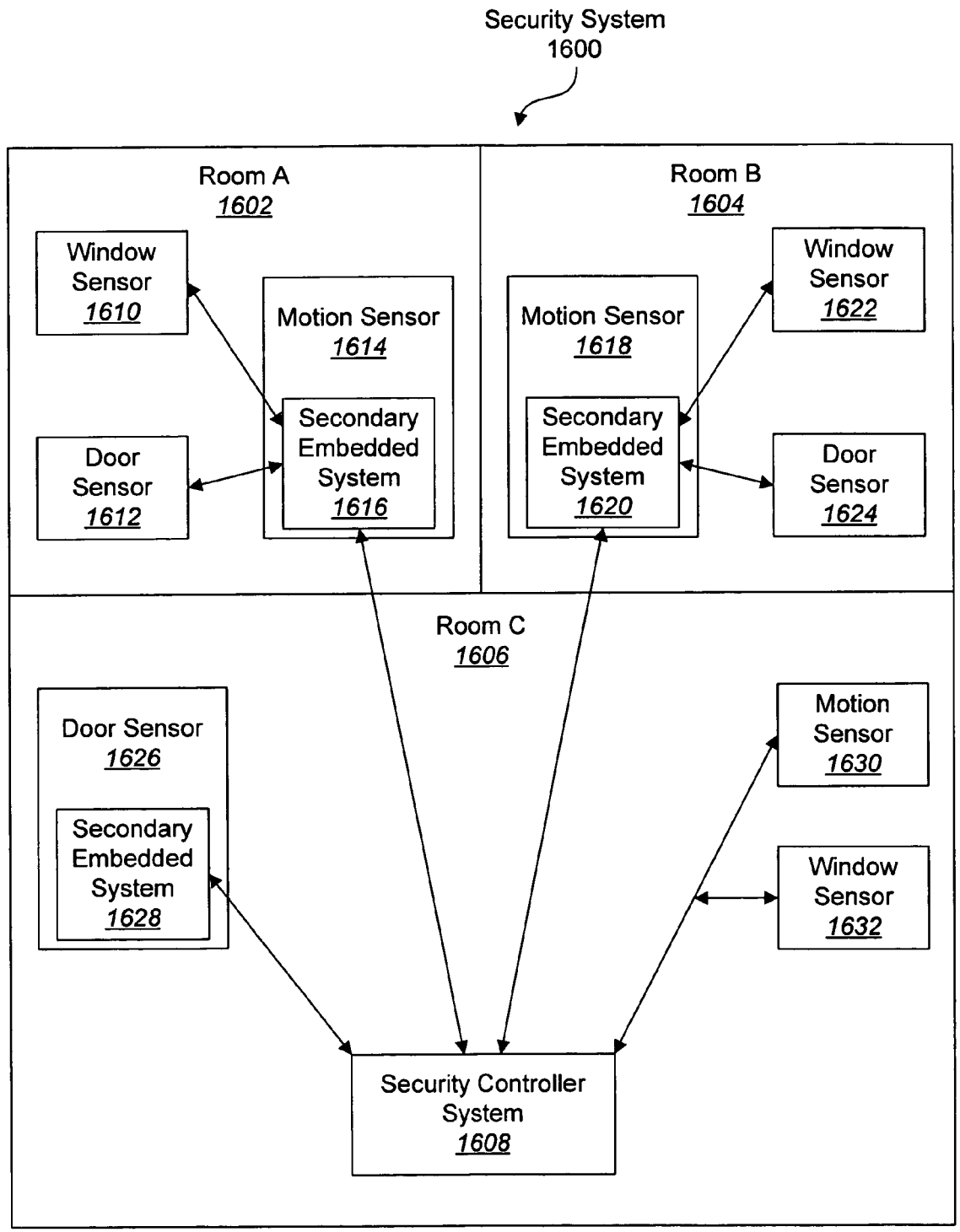
FIG. 16 is a block diagram illustrating a security system that may utilize the systems and methods disclosed herein.

FIG. 16 is an additional embodiment of a system wherein the present systems and methods may be implemented. FIG. 16 is a block diagram illustrating a security system 1600. The security system 1600 in the depicted embodiment is implemented in a room A 1602, a room B 1604, and a room C 1606. These rooms may be in the confines of a home or other enclosed environment. The system 1600 may also be implemented in an open environment where the rooms A, B and C, 1602, 1604, and 1606 respectively represent territories or boundaries.

The system 1600 includes a security controller system 1608. The security controller system 1608 monitors and receives information from the various components within the system 1600. For example, a motion sensor 1614, 1618 may include a secondary embedded system 1616, 1620. The motion sensors 1614, 1618 may monitor an immediate space for motion and alert the security controller system 1608 when motion is detected via the secondary embedded system 1616, 1620. The security controller system 1608 may also provide instructions to the various components within the system 1600. For example, the security controller system 1608 may provide instructions to the secondary embedded systems 1616, 1620 to power up or power down a window sensor 1610, 1622 and a door sensor 1612, 1624. In one embodiment, the secondary embedded systems 1616, 1620 notify the security controller system 1608 when the window sensors 1610, 1622 detect movement of a window. Similarly, the secondary embedded systems 1616, 1620 notify the security controller system 1608 when the door sensors 1612, 1624 detect movement of a door. The secondary embedded systems 1616, 1620 may instruct the motion sensors 1614, 1618 to activate the LED (not shown) located within the motion sensors 1614, 1618.

The security controller system 1608 may also monitor and provide instructions directly to individual components within the system 1600. For example, the security controller system 1608 may monitor and provide instructions to power up or power down to a motion sensor 1630 or a window sensor 1632. The security controller system 1608 may also instruct the motion sensor 1630 and the window sensor 1632 to activate the LED (not shown) or audio alert notifications within the sensors 1630 and 1632.

Each individual component comprising the system 1600 may also include a secondary embedded system. For example, FIG. 16 illustrates a door sensor 1626 including a secondary embedded system 1628. The security controller system 1608 may monitor and provide instructions to the secondary embedded system 1628 in a similar manner as previously described.

Figure 17:
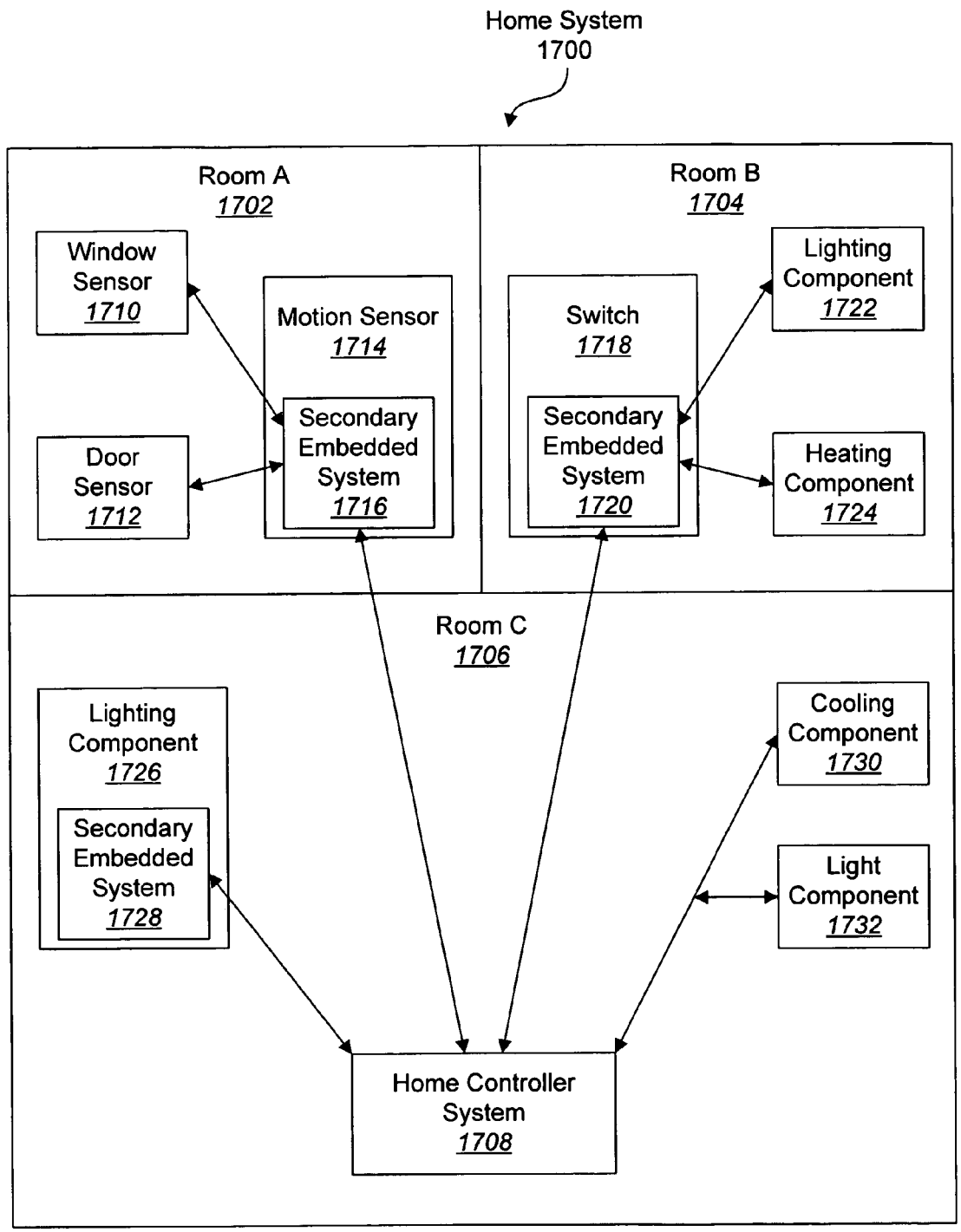
FIG. 17 is a block diagram illustrating a home system that may utilize the systems and methods disclosed herein.

FIG. 17 is a block diagram illustrating one embodiment of a home system 1700. The home system 1700 includes a home controller 1708 that facilitates the monitoring of various systems such as the lighting system 1500, the security system 1600, and the like. The home system 1700 allows a user to control various components and systems through one or more embedded systems. In one embodiment, the home controller system 1708 monitors and provides information in the same manner as previously described in relation to FIGS. 15 and 16. In the depicted embodiment, the home controller 1708 provides instructions to a heating component 1724 via a secondary embedded system 1720. The heating component 1724 may include a furnace or other heating device typically found in resident locations or offices. The home controller system 1708 may provide instructions to power up or power down the heating component 1724 via the secondary embedded system 1720.

Similarly, the home controller 1708 may monitor and provide instructions directly to a component within the home system 1700 such as a cooling component 1730. The cooling component 1730 may include an air conditioner or other cooling device typically found in resident locations or offices. The central home controller 1708 may instruct the cooling component 1730 to power up or power down depending on the temperature reading collected by the central embedded system 1708. The home system 1700 functions in a similar manner as previously described in relation to FIGS. 15 and 16.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requestor. Providers can also be set up to publish their state information to subscribers. A requester may ask for periodic reports or for updates whenever the state changes, perhaps with some means of limiting how often updates are to be sent. Providers can be set up to notify requesters when some event or exceptional condition occurs.

Another example of a device network application is remote control, where requestors are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved, a requestor may use a web browser, pager or even a WAP-enabled cell phone to communicate with a provider in a more or less interactive manner. As the number of providers grows, however, these methods may become unworkable and requestors may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for selectively controlling electrical outlets using power profiling comprising:
   a plurality of electrical outlets, wherein each electrical outlet comprises:
      a power socket capable of receiving a plug;
      a switch that when in a first position no power is available at the power socket, and when the switch is in a second position power is available at the power socket;
      an outlet identification;
   a controller in electronic communication with the plurality of electrical outlets, wherein the controller comprises:
      a processor;
      memory in electronic communication with the processor;
      power profiles, wherein each power profile comprises a power threshold indicating the amount of power a device or class of device should not exceed;
      instructions stored in the memory, the instructions being executable to:
         receive data from an electrical outlet of the plurality of electrical outlets;
         identify a device or class of device based on the received data;
         identify a power profile from the power profiles based on the identified device or class of device; and
         take action based on the power profile, wherein if the power threshold for the identified device or class of device is exceeded, power is disabled to the outlet providing power to the identified device or class of device.

2. The system as defined in claim 1, wherein taking action comprises staffing a timer.

3. The system as defined in claim 1, wherein taking action comprises sending a command to the electrical outlet.

4. The system as defined in claim 3, wherein the command causes the switch to be in the first position such that no power is available at the power socket.

5. The system as defined in claim 3, wherein the command causes the switch to be in the second position such that power is available at the power socket.

6. The system as defined in claim 1, wherein each electrical outlet further comprises a signal detector for receiving a signal from a signal producing element.

7. The electrical outlet device as defined in claim 6, wherein the signal detector comprises an RFID reader.

8. The electrical outlet device as defined in claim 6, wherein the signal detector comprises a barcode reader.

9. The system as defined in claim 1, wherein each electrical outlet further comprises a signal detector for receiving commands from the controller.

10. The system as defined in claim 1, wherein the controller further comprises rules for determining allowed power use by devices.

11. The system as defined in claim 1, wherein the instructions stored in the memory of the controller are further executable to store the device or the class of device in a device database.

12. The system as defined in claim 1, wherein the instructions stored in the memory of the controller are further executable to obtain the outlet identification from the received data.

13. The system as defined in claim 1, wherein the instructions stored in the memory of the controller are further executable to:
start a timer based on a first device that was identified;
wait for time to expire on the timer;
send a command to the electrical outlet when the time expires that causes the switch to go from the second position to the first position such that no power is available at the power socket.

14. The system as defined in claim 1, wherein the instructions stored in the memory of the controller are further executable to allow user input to store user preferences and to add new rules.

15. The system as defined in claim 1, wherein the controller further comprises a network interface to connect to a computer network in order to download updated power profiles.

16. The system as defined in claim 1, wherein the instructions stored in the memory of the controller are further executable to receive inputs from a lighting controller system to be used in determining a next action, wherein the lighting controller system is in electronic communication with the controller, and wherein the inputs from the lighting controller system comprise light switch inputs from certain rooms, and wherein the next action comprises sending a command to at least one electrical outlet of the plurality of electrical outlets from the certain rooms.

17. The system as defined in claim 1, wherein the instructions stored in the memory of the controller are further executable to receive inputs from a security controller system to be used in determining a next action, wherein the security controller system is in electronic communication with the controller, and wherein the inputs from the security controller system comprise sensor inputs from certain rooms, and wherein the next action comprises sending a command to at least one electrical outlet of the plurality of electrical outlets from the certain rooms.

18. An electrical plug adapter for enabling a device to be used with a system for selectively controlling electrical outlets using power profiling, the adapter comprising:
one or more holes for receiving one or more contacts from a plug; and
a signal producing element that produces a signal to be used in combination with an electrical outlet that is configured for use with a system for selectively controlling electrical outlets using power profiling, wherein the power profile used by the system comprises a power threshold indicating the amount of power a device or class of device should not exceed, wherein the signal producing element produces a signal that allows the electrical outlet or a controller to identify the specific device or class of device, wherein if the power threshold for the identified device or class of device is exceeded, power is disabled to the outlet providing power to the identified device or class of device.

19. A controller for selectively controlling electrical devices using power profiling comprising:
a processor;
memory in electronic communication with the processor;
an interface for communications with a plurality of electrical devices or outlets;
power profiles, wherein each power profile comprises a power threshold indicating the amount of power a device or class of device should not exceed;
instructions stored in the memory, the instructions being executable to:
receive data from an electrical device or outlet of the plurality of electrical devices or outlets;
identify a device or class of device based on the received data;
identify a power profile based on the identified device or class of device; and
take action based on the power profile, wherein if the power threshold for the identified device or class of device is exceeded, power is disabled to the outlet providing power to the identified device or class of device.

20. The controller as defined in claim 19, wherein the data is received from an electrical device that is not receiving power through an outlet.

21. The controller as defined in claim 20, wherein the action taken based on the power profile comprises dimming a light.

22. An electrical outlet for use with a system for selectively controlling electrical outlets using power profiling, the electrical outlet comprising:
a power socket capable of receiving a plug;
a switch that when in a first position no power is available at the power socket, and when the switch is in a second position power is available at the power socket;
an outlet identification;
a signal detector that is capable of detecting a signal from the plug, that is capable of sending the signal and the outlet identification to a controller to allow the controller to identify the specific device or class of device, and that is capable of receiving a command from the controller, the controller comprising power profiles, wherein each power profile comprises a power threshold indicating the amount of power the specific device or class of device should not exceed, and wherein the signal detector is in electrical communication with the switch such that when the signal detector receives a power off command from the controller, the signal detector causes the switch to be in the first position, and such that when the signal detector receives a power on command from the controller, the signal detector causes the switch to be in the second position, wherein if the power threshold for the specific device or class of device is exceeded, power is disabled to the outlet providing power to the identified device or class of device.

* * * * *

UNITED STATES PATENT AND TRADEMARK OFFICE
CERTIFICATE OF CORRECTION

| | | |
|---|---|---|
| PATENT NO. | : 7,657,763 B2 | Page 1 of 1 |
| APPLICATION NO. | : 11/321705 | |
| DATED | : February 2, 2010 | |
| INVENTOR(S) | : Nelson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twenty-eighth Day of December, 2010

David J. Kappos
*Director of the United States Patent and Trademark Office*